United States Patent [19]
Wevers

[11] Patent Number: 5,380,057
[45] Date of Patent: Jan. 10, 1995

[54] VEHICLE SUN VISOR

[76] Inventor: Thomas J. Wevers, 535 Strathdee Place, Victoria, British Columbia, Canada, V9C 2R7

[21] Appl. No.: 76,841
[22] Filed: Jun. 15, 1993
[51] Int. Cl.⁶ .............................................. B60J 3/02
[52] U.S. Cl. .................................. 296/97.11; 296/97.13
[58] Field of Search .................. 296/97.9, 97.11, 97.13

[56] References Cited

U.S. PATENT DOCUMENTS

| | | | |
|---|---|---|---|
| 1,746,334 | 2/1930 | Bollesen | 296/97.11 X |
| 1,772,233 | 8/1930 | Vivier | 296/97.11 X |
| 1,806,059 | 5/1931 | Hoople | 296/97.9 X |
| 1,913,277 | 6/1933 | Hoople | 296/97.9 X |
| 1,941,032 | 12/1933 | Knowles | 296/97.11 X |
| 2,235,421 | 3/1941 | Devine | 296/97.11 |
| 3,032,371 | 5/1962 | Berridge et al. | 296/97.11 |
| 3,151,662 | 10/1964 | Fait | 296/97.11 X |
| 3,834,755 | 9/1974 | Dexter | 296/97.11 |

FOREIGN PATENT DOCUMENTS

| | | | |
|---|---|---|---|
| 466278 | 10/1952 | Italy | 296/97.9 |
| 0182521 | 11/1982 | Japan | 296/97.11 |

*Primary Examiner*—Dennis H. Pedder
*Attorney, Agent, or Firm*—Hugh E. Smith

[57] ABSTRACT

A sun visor for use in a vehicle wherein the visor is not only capable of being swung from side to side but also is adjustable vertically. The unit may be provided in kit form for use by an automobile owner not only as a total replacement for an existing visor system but also capable of making use of the owners' own visor if desired.

3 Claims, 3 Drawing Sheets

VEHICLE SUN VISOR

BACKGROUND OF THE INVENTION

1. Field of the Invention

The present invention relates to vehicle sun visor and more particularly pertains to such devices which may be vertically adjustable within the vehicle.

2. Description of the Prior Art

The use of sun visors is known in the prior art. More specifically, such visors heretofore devised and utilized for the purpose of shading one from the sun within a vehicle are known to consist basically of familiar, expected and obvious structural configurations, notwithstanding the myriad of designs encompassed by the crowded prior art which have been developed for the fulfillment of countless objectives and requirements. Known visors swing from side to side and flip up or down, but the protection is limited to that provided by the visor width. Typical configurations are shown in U.S. Pat. Nos. 5,044,687; 4,971,381; 4,919,468; 5,056,854; 4,979,079; and 4,921,300.

In this respect, the sun visor according to the present invention substantially departs from the conventional concepts and designs of the prior art, and in so doing provides an apparatus primarily developed for the purpose of maximum adjustability.

Therefore, it can be appreciated that there exists a continuing need for new and improved sun visor which can be vertically adjusted. In this regard, the present invention substantially fulfills this need.

SUMMARY OF THE INVENTION

In view of the foregoing disadvantages inherent in the known types of sun visors now present in the prior art, the present invention provides an improved sun visor construction wherein the same can be vertically adjusted as well as swinging and pivoting like the prior art devices. As such, the general purpose of the present invention, which will be described subsequently in greater detail, is to provide a new and improved sun visor construction which has all the advantages of the prior art devices and none of the disadvantages.

To attain this, the present invention essentially comprises a sun visor device in which means are provided to move the sun visor vertically to more broadly cover areas from which the sun may bother the driver of a vehicle. The device may be use to mount the existing sun visor if desired.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sun visor which has all the advantages of the prior art sun visors and none of the disadvantages.

It is another object of the present invention to provide a new and improved vehicle sun visor which may be easily and efficiently manufactured and marketed.

It is a further object of the present invention to provide a new and improved vehicle sun visor which is of a durable and reliable construction.

An even further object of the present invention is to provide a new and improved sun visor which is susceptible of a low cost of manufacture with regard to both materials and labor, and which accordingly is then susceptible of low prices of sale to the consuming public, thereby making such devices economically available to the buying public.

Still another object of the present invention is to provide a new and improved vehicle sun visor.

Yet another object of the present invention is to provide a new and improved more adjustable vehicle sun visor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
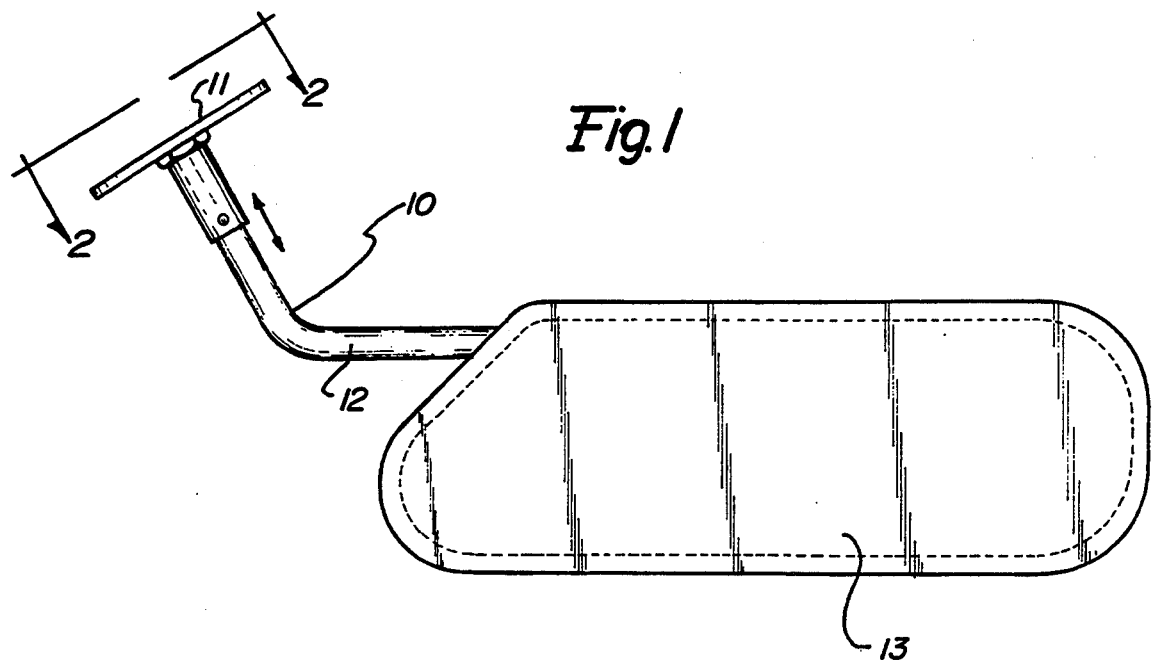
FIG. 1 is side plan view of the device of the present invention.

With reference now to the drawings, and in particular to FIG. 1 thereof, a new and improved vehicle sun visor mounting embodying the principles and concepts of the present invention and generally designated by the reference numeral 10 will be described.

Figure 2:
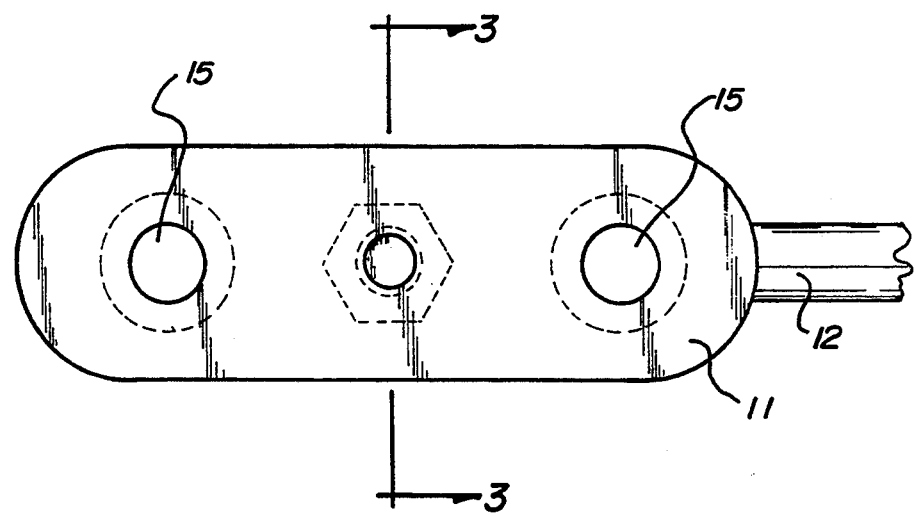
FIG. 2 is an end plan view of the bracket support of the present invention taken on line 2—2 of FIG. 1.

More specifically, it will be noted that the sun visor mounting comprises a base mounting plate 11 having a sun visor supporting arm 12 extending therefrom and a sun visor 13 mounted at the end of arm 12. Arm 12 is slidably mounted telescopically in a tube 14 extending from base plate 11. Since base plate 11 is normally affixed to the upper molding of the vehicle's windshield or roof frame, sliding arm 12 outwardly of tube 14 causes visor 13 to be lowered in relationship to the eye of the vehicle operator. As shown in FIG. 2, recessed or counter sunk screw holes 15 are provided in base plate 11.

Figure 3:
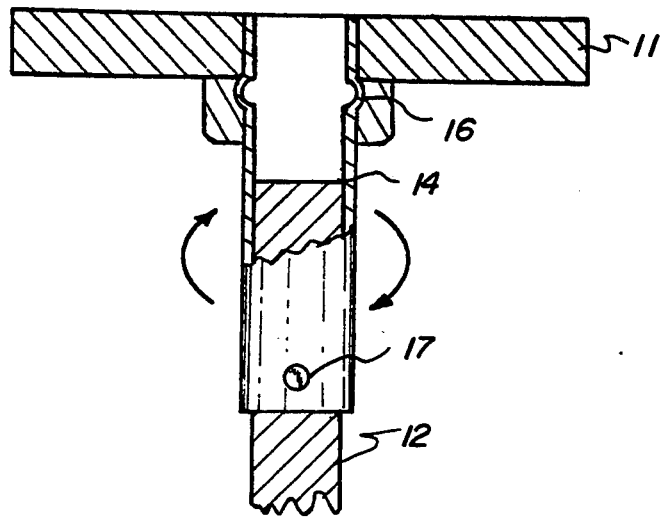
FIG. 3 is a sectional view on line 3—3 of FIG. 2.

FIG. 3 shows the manner of engagement of arm 12 and base plate 11. Tube 14 extends downwardly from base plate 11 and is rotatably mounted therein by a plastic (preferably nylon) bearing member 16. Tube 14 is adjustably secured to arm 12 as by a set screw 17. Movement of arm 12 causes tube 14 to rotate within the bearing 16. Also arm 12 may be moved into or out of tube 14 by loosening such set screw 17. As pointed out above this will have the effect of raising or lowering visor 13.

Figure 4:
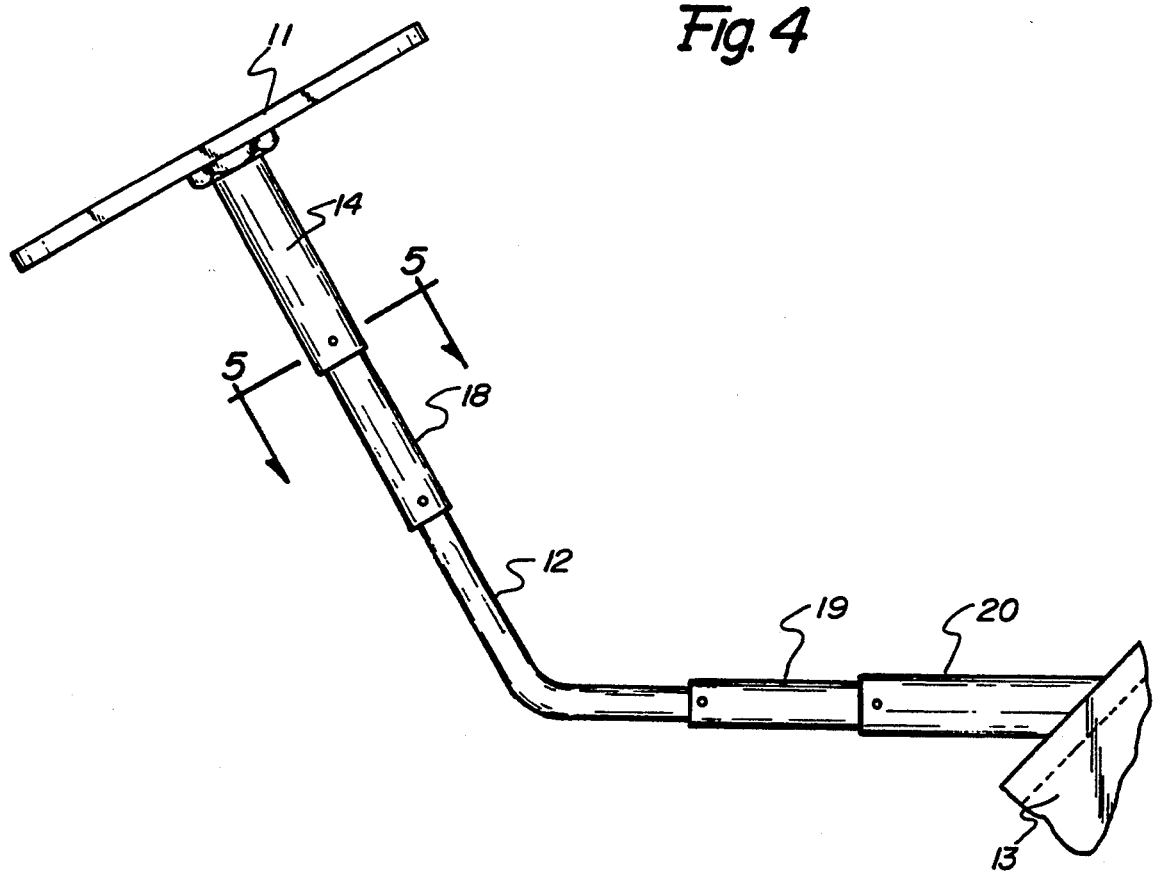
FIG. 4 is a side plan view of a modification of the device of FIG. 1.
Figure 5:
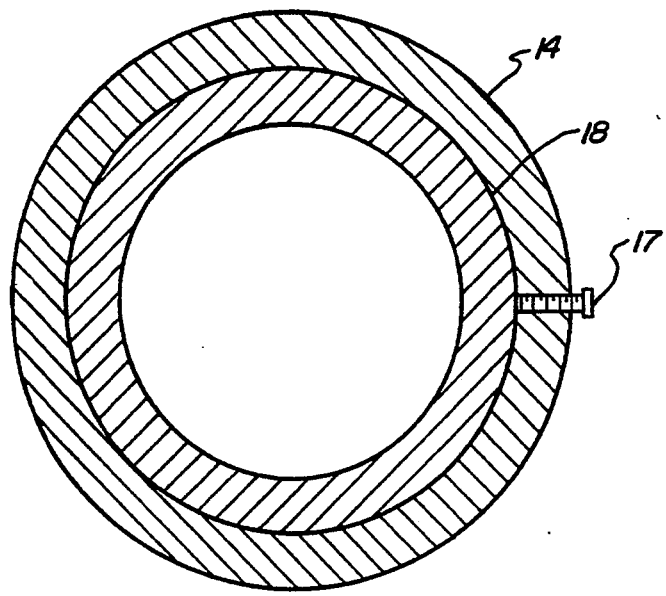
FIG. 5 is a sectional view taken on line 5—5 of FIG. 4.

FIG. 4 illustrates a modification of the device 10 of FIG. 1 in that arm 12 is made further adjustable by providing additional slidable tubes 18, 19 and 20 in association with arm 12. As shown in FIG. 5 each of the tubes 14, 18, 19, and 20 are in slidable relationship to the tube with which it is in contact while set screw 17 regulates the ability of such tube to move relative to the other.

Figure 7:
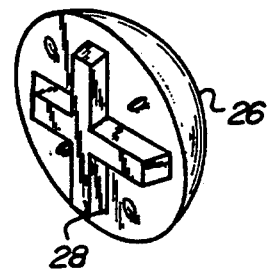
FIG. 7 is a screw cover for use in the device of FIG. 6.
Figure 6:
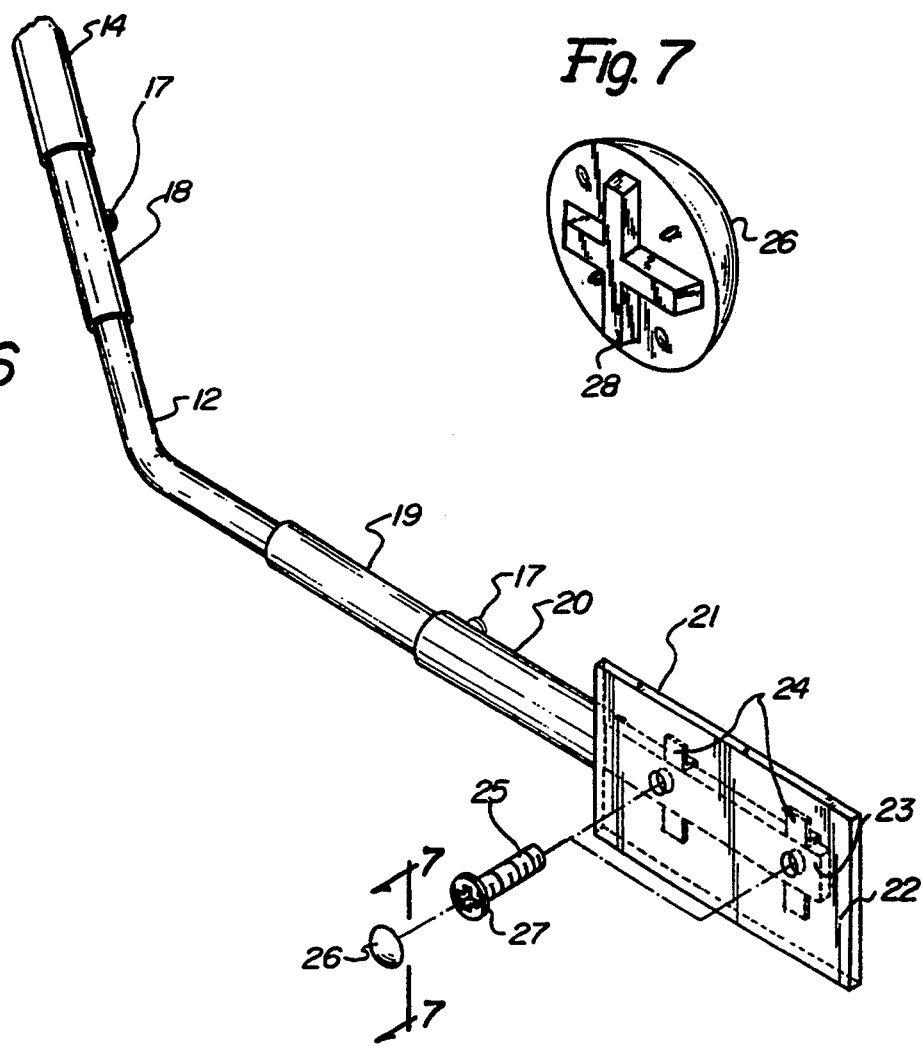
FIG. 6 is a modification of the visor holder to readily accept an existing owner's visor.

FIG. 6 illustrates a universal visor mount (which may be utilized when the unit 10 is sold as an entire device or may b supplied without the actual visor 13 where the user wishes to use an existing visor from his vehicle). This mount 21 comprises a flat backing plate 22 adapted to lie against a flat extension 23 from the end of tube 12 as in FIG. 1 or from the end of tube 20 as shown in FIG. 6. A pair of fastening clips 24, either integral with extension 23 or separate therefrom holds the back of plate 22 against extension 23 by means of threaded bolts 25 extending through the visor 13 and the plates 22 and 23 and into such clips 24. As shown in FIGS. 6 and 7 a decorative cover cap 26 fits over bolt 25 to hide the same. As shown here, bolt 25 preferably has a "coin-head" slot 27 in the outer end thereof, in which case decorative cover cap 26 has a corresponding cruciform projection 28 to mate within slot 27.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicle sun visor comprising:

a visor;

a base mounting plate having a first pair of spaced screw holes extending therethrough to facilitate, said first screw holes being operable to receive threaded fasteners to secure said base mounting plate to a portion of a vehicle, said base mounting plate having a center aperture positioned between said first pair of screw holes;

a mounting tube rotatably secured to said base mounting plate between said screw holes and extending at least partially through said center apertures, said tube projecting substantially orthogonally from said base mounting plate;

a first slidable tube movably positioned at least partially within said mounting tube, said first slidable tube being substantially hollow;

a first set screw directed through said mounting tube and into engagement with said first slidable tube for securing a position of said first slidable tube relative to said mounting tube;

a supporting arm extending at least partially into said first slidable tube, said supporting arm including a first portion and a second portion with said first portion extending from said first slidable tube and integrally continuing into said second portion, wherein said second portion is oriented at an oblique angle relative to said first portion;

a second slidable tube movably positioned at least partially over said second portion of said supporting arm;

a third slidable tube movably positioned at least partially over said second slidable tube, said third slidable tube having an outer distal end;

a second set screw directed through said third slidable tube and into engagement with said second slidable tube for securing a position of said second slidable tube relative to said third slidable tube;

a flat extension having a front face and a back face and projecting from said outer distal end of said third slidable tube, said flat extension having a second pair of spaced screw holes extending therethrough;

a first fastening clip positioned into abutting relation with said back face of said flat extension over one of said second pair of screw holes;

a second fastening clip positioned into abutting relation with said back face of said flat extension over another of said second pair of screw holes;

a backing plate mounted to said outer distal end of said third slidable tube, said backing plate comprising a substantially flat planar member having a third pair of spaced screw holes aligned with said second pair of screw holes, said backing plate being positioned into abutting relation with said front face of said flat extension; and, a pair of bolts extending through said visor and through both an individual one of said third pair of screw holes and an individual one of said second pair of screw holes to threadably engage with an individual one of said fastening clips.

2. The vehicle sun visor as recited in claim 1, wherein each of said bolts comprises a head having a slot extending therethrough, and further comprising at least one cover cap having a projection extending therefrom, with said projection being received within said slot of said bolt to secure said cover cap to said bolt head.

3. The vehicle sun visor as recited in claim 2, wherein said cover cap includes a substantially flat face from which said projection extends, and a substantially arcuate outer face.

* * * * *